United States Patent
Choi

(10) Patent No.: US 10,131,221 B2
(45) Date of Patent: Nov. 20, 2018

(54) POWER TRAIN FOR HYBRID ELECTRIC VEHICLE

(71) Applicant: Hyundai Motor Company, Seoul (KR)

(72) Inventor: Yeong Il Choi, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 357 days.

(21) Appl. No.: 14/946,717

(22) Filed: Nov. 19, 2015

(65) Prior Publication Data

US 2016/0325616 A1 Nov. 10, 2016

(30) Foreign Application Priority Data

May 7, 2015 (KR) .................. 10-2015-0063776

(51) Int. Cl.
| | |
|---|---|
| *F16H 3/08* | (2006.01) |
| *B60K 6/50* | (2007.10) |
| *F16H 3/00* | (2006.01) |
| *B60K 6/442* | (2007.10) |
| *B60K 6/387* | (2007.10) |
| *F16H 3/097* | (2006.01) |
| *B60K 6/48* | (2007.10) |

(52) U.S. Cl.
CPC .............. *B60K 6/50* (2013.01); *B60K 6/387* (2013.01); *B60K 6/442* (2013.01); *F16H 3/006* (2013.01); *F16H 3/097* (2013.01); *B60K 2006/4808* (2013.01); *B60Y 2200/92* (2013.01); *B60Y 2300/184* (2013.01); *B60Y 2400/42* (2013.01); *Y02T 10/626* (2013.01); *Y10S 903/915* (2013.01)

(58) Field of Classification Search
CPC .......... F16H 37/021; F16H 2003/0931; F16H 2003/007; F16H 2003/008
USPC .................... 74/330, 331, 333, 340
See application file for complete search history.

(56) References Cited

U.S. PATENT DOCUMENTS

| | | | | |
|---|---|---|---|---|
| 6,634,247 B2 * | 10/2003 | Pels | .......... | B60K 6/26 477/6 |
| 7,226,379 B2 * | 6/2007 | Ibamoto | .......... | B60K 6/36 180/65.25 |
| 7,272,987 B2 * | 9/2007 | Hughes | .......... | B60K 6/36 477/5 |
| 8,364,364 B1 * | 1/2013 | Tao | .......... | F16H 59/18 137/118.02 |
| 8,479,603 B2 * | 7/2013 | Ikegami | .......... | B60K 6/48 74/330 |

(Continued)

FOREIGN PATENT DOCUMENTS

| | | |
|---|---|---|
| JP | 2002-089594 A | 3/2002 |
| JP | 2009-143356 A | 7/2009 |
| JP | 2013-095239 A | 5/2013 |

(Continued)

*Primary Examiner* — Ha Dinh Ho

(74) *Attorney, Agent, or Firm* — Mintz Levin Cohn Ferris Glovsky and Popeo, P.C.; Peter F. Corless

(57) ABSTRACT

A power train for a hybrid electric vehicle includes only one motor and an engine, and further includes a structure capable of reducing a capacity of the motor. The power train may high-efficiently implement various driving modes such as a high-efficiency EV mode, an engine and motor parallel HEV mode, and an engine connecting mode using only the one motor and engine, in order to achieve a reduced manufacturing cost as compared to a conventional power train in which two motors are used.

7 Claims, 4 Drawing Sheets

(56) References Cited

U.S. PATENT DOCUMENTS 8,667,857 B2 * 3/2014 Brandenburg .......... F16H 61/16
74/330

FOREIGN PATENT DOCUMENTS

| JP | 2013-100060 A | 5/2013 |
| JP | 2013-121788 A | 6/2013 |
| KR | 10-2008-0011486 A | 2/2008 |
| KR | 10-0802712 B1 | 2/2008 |

* cited by examiner

[ START/N-STAGE CHARGE ]

[ EV MODE/REGENERATIVE MODE ]

[ HEV MODE (MOTOR ASSIST) ]

[ HEV MODE (MOTOR CHARGE) ]

[ ENGINE ONLY ]

POWER TRAIN FOR HYBRID ELECTRIC VEHICLE

CROSS-REFERENCE TO RELATED APPLICATION

This application claims under 35 U.S.C. § 119(a) the benefit of Korean Patent Application No. 10-2015-0063776 filed on May 7, 2015, the entire contents of which are incorporated herein by reference.

BACKGROUND (a) Technical Field

The present invention relates to a power train for a hybrid electric vehicle, more particularly, to a power train that includes two motors and an engine, and further includes a structure capable of reducing a motor capacity.

(b) Description of the Related Art

A hybrid electric vehicle, which is a type of eco-friendly vehicle, includes various power transmission devices using an engine and a motor as power sources. The power transmission devices have been developed and applied in various forms such as a series-type, a parallel-type, and a power split-type combining advantages of the series-type and the parallel-type.

The purpose of such hybrid electric vehicles is to provide a vehicle with high fuel efficiency and low cost. Accordingly, research has been conducted on a power transmission system capable of avoiding power source efficiency reduction, power transmission structure loss, and energy conversion loss, which are factors that may reduce fuel efficiency, and simultaneously achieving operation at a high-efficiency operating point.

An example of a conventional hybrid power transmission system is shown in FIG. 1 (RELATED ART).

As shown in FIG. 1, the power transmission system includes an engine ENG, two motors MG1 and MG2, and an over drive clutch and a power transmission gear therebetween.

In addition to EV mode in which the second motor MG2 of the two motors is directly connected to an output shaft, a generation mode in which a driving force of an engine is delivered to the first motor MG1 for generation through a simple gear, and an engine mode in which engine power is delivered to the output shaft through an Over Drive Clutch (ODC) engagement for high-efficiency point operation of the engine during high-speed driving may be implemented.

However, during HEV mode driving in which both engine and motor power are together used, since all driving force of the engine is outputted to the second motor MG2 after the generation of the generator MG1, energy conversion loss occurs twice, incurring reduction of the fuel efficiency. Particularly, since two high-capacity motors are used, the manufacturing cost may be significantly increased.

Another example of a conventional hybrid power transmission system is shown in FIG. 2 (RELATED ART).

As shown in FIG. 2, the power transmission system includes an engine ENG, two motors MG1 and MG2, and two planetary gear sets therebetween.

In addition to EV mode in which the second motor MG2 of the two motors is directly connected to an output shaft through the planetary gear, HEV mode in which an driving force of an engine branches through the planetary gear, allowing a portion of the driving force to branch to the output shaft and allowing the other portion of the driving force to branch to the first motor MG1, may be implemented.

However, in EV mode, since power is outputted through one planetary gear and two pairs of external gears, it is disadvantageous in terms of transmission efficiency. Also, in HEV mode, a portion of engine power branches through the planetary gear and thus there is little energy conversion loss. However, since two high-capacity motors are used, there is a limitation in that the manufacturing cost may be significantly increased.

Thus, there is a need for a new type of power transmission system which can improve fuel efficiency by reducing the energy conversion loss and can reduce the manufacturing cost by reducing the number of parts used in the power transmission system.

The above information disclosed in this Background section is only for enhancement of understanding of the background of the invention and therefore it may contain information that does not form the prior art that is already known in this country to a person of ordinary skill in the art.

SUMMARY

The present invention provides a structure of a power train for a hybrid electric vehicle, which may implement various driving modes such as high-efficiency EV mode, engine and motor parallel HEV mode, and engine connecting mode using only one motor and an engine, and thus may increase efficiency and reduce the manufacturing cost as compared to a conventional power train in which two motors are used.

In one aspect, the present invention provides a power train for a hybrid electric vehicle, including: an engine; a dual clutch simultaneously connected to an output shaft of the engine and including a first clutch and a second clutch; a first synchronizer and a second synchronizer mounted on an output shaft of the first clutch and an output shaft of the second clutch, respectively; an engine power output shaft synchronized with the first synchronizer or the second synchronizer to output an engine power; a motor connected to the output shaft of the first clutch or the output shaft of the second clutch; a motor input clutch mounted to exchange power between the output shaft of the first clutch and the motor or between the output shaft of the second clutch and the motor; and a motor output clutch mounted on an output shaft of the motor to cut or connect an output of motor power.

In an exemplary embodiment, the power train may further include: a first output gear connected to an end portion of the output shaft of the motor; a second output gear connected to the engine power output shaft; and a final output gear simultaneously engaged with the first output gear and the second output gear.

In another exemplary embodiment, while the first clutch and the motor input clutch are engaged, an engine start mode in which the motor power is delivered to the engine or an N-stage charge mode in which the engine power is delivered to the motor may be implemented.

In still another exemplary embodiment, while only the motor output clutch is engaged, a regenerative braking mode or an EV mode in which the motor power is outputted through the output shaft of the motor may be implemented.

In yet another exemplary embodiment, while the first clutch or the second clutch is engaged and simultaneously the motor output clutch is engaged, an HEV (motor assist) mode in which the engine power is outputted to the engine power output shaft through the first or second synchronizer and simultaneously the motor power is auxiliary outputted through the output shaft of the motor may be implemented.

In still yet another exemplary embodiment, while the first clutch or the second clutch is engaged and simultaneously the motor output clutch is engaged, an HEV (motor charge) mode in which the engine power is outputted to engine power output shaft through the first or second synchronizer and simultaneously a spare power of the engine is inputted to the motor for generation may be implemented.

In a further exemplary embodiment, while the first clutch or the second clutch is engaged, an engine only mode in which the engine power is outputted to engine power output shaft through the first or second synchronizer may be implemented.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
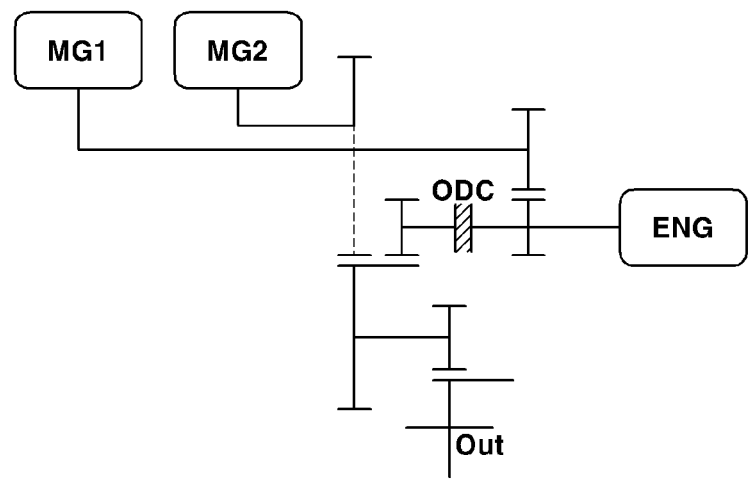
FIGS. 1 and 2 (RELATED ART) are views illustrating conventional power transmission systems for a hybrid vehicle.
Figure 2:
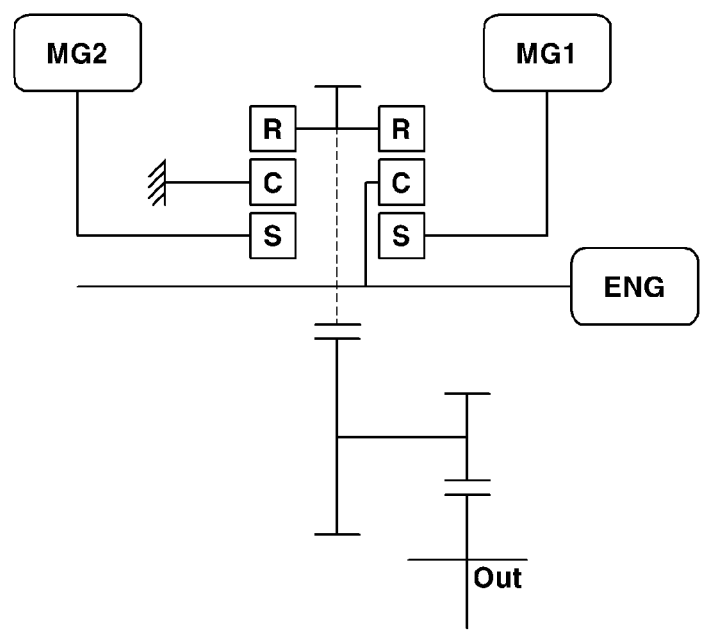

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The above and other features of the invention are discussed infra.

Hereinafter, exemplary embodiments of the present invention will be described in detail with reference to the accompanying drawings so that those skilled in the art can easily carry out the present invention.

The present invention focuses on reducing the manufacturing cost by using only one motor and an engine as compared to a conventional powertrain system using two motors, and implementing various driving modes by connecting a dual clutch and a synchronizer to the engine and simultaneously a motor input and an output clutch to the front and rear ends of the motor.

Figure 3:
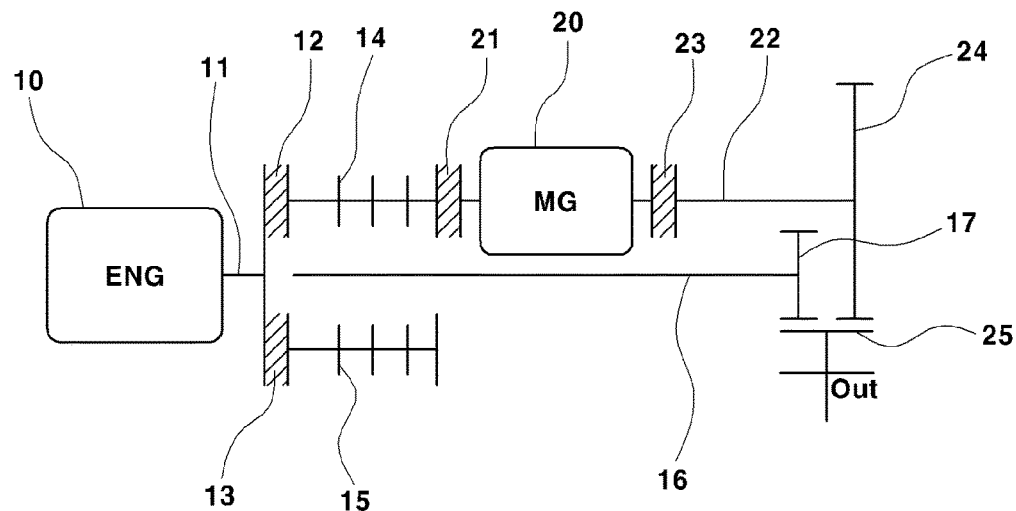
FIG. 3 is a view illustrating a power transmission system for a hybrid vehicle according to an embodiment of the present invention.

FIG. 3 is a view illustrating a power transmission system for a hybrid vehicle according to an embodiment of the present invention. The reference numeral 10 denotes an engine, and the reference numeral 20 denotes a motor.

A dual clutch may be connected to an output shaft 11 of the engine 10.

In particular, the dual clutch may include a first clutch 12 and a second clutch 13 which are simultaneously connected to the output shaft 11 of the engine 10. Thus, engine power may be selectively outputted through the first clutch 12 or the second clutch 13.

In this case, a first synchronizer 14 and a second synchronizer 15 are mounted on an output shaft of the first clutch 12 and an output shaft of the second clutch 13, respectively, to synchronize the engine power with an engine power output shaft 16 and deliver the engine power.

Preferably, the engine power output shaft 16 is disposed between the first synchronizer 14 and the second synchronizer 15, and the end portion of the engine power output shaft 16 is connected to a second output gear 17.

The motor 20 is power-exchangeably connected to the output shaft of the first clutch 12, or is power-exchangeably connected to the output shaft of the second clutch 13.

Also, a motor input clutch 21 is mounted on the input side of the motor 20 to exchange or cut power with/from the output shaft of the first clutch 12 or the output shaft of the second clutch 13.

Also, a motor output clutch 23 is mounted on the output shaft 22 of the motor 20 to allow or interrupt the output of the motor power, and a first output gear 24 for final output and deceleration of the motor power is connected to the end portion of the output shaft 22 of the motor 20.

In this case, the second output gear 17 connected to the end portion of the engine power output shaft 16 and the first output gear 24 connected to the end portion of the output shaft 22 of the motor 20 simultaneously engage with a final output gear 25 that decelerates and finally outputs the engine power and/or the motor power.

Hereinafter, the power train for a hybrid electric vehicle including the components described above will be further described for each driving mode. In order to help understanding of the present invention, it will be explained that the motor 20 is power-exchangeably connected to the output shaft of the first clutch 12 instead of the second clutch 13.

Engine Start/N-Stage Charge Mode

Figure 4:
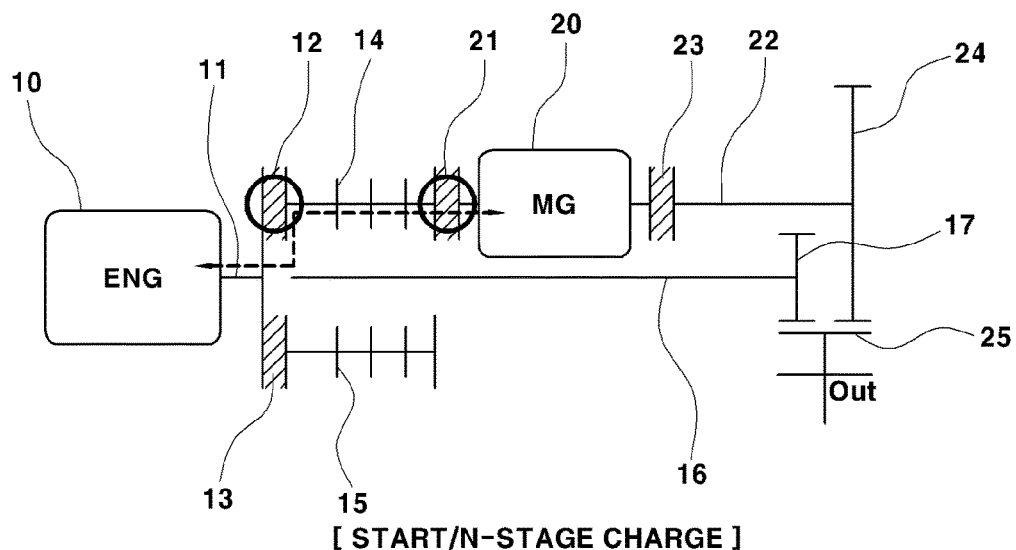
FIGS. 4 to 8 are views illustrating driving modes of a power transmission system for a hybrid vehicle according to an embodiment of the present invention.

FIG. 4 shows a power transmission flow by a power train for a hybrid electric vehicle during engine start/N-stage charge mode according to an embodiment of the present invention. In FIG. 4, the circles indicate clutch engagement, and the hidden line indicates a power transmission flow state.

The first clutch 12 and the motor input clutch 21 are engaged, and the second clutch 13 and the motor output clutch 23 are disengaged. Also, the first and second synchronizers 14 and 15 are maintained in a state where the synchronization is released.

In this state, when a current is applied to the motor 20 to operate, the motor power is delivered from the motor input clutch 21 to the engine 10 through the output shaft of the first clutch 12 and then the first clutch 12, starting the engine 10.

After the engine starts, when the gear shift stage is located at N-stage, the power of the engine 10 is inputted from the first clutch 12 to the motor 20 through the output shaft of the first clutch 12 and the motor input clutch 21, allowing the motor 20 to operate as a generator and thus charging a battery.

EV Mode/Regenerative Mode

Figure 5:
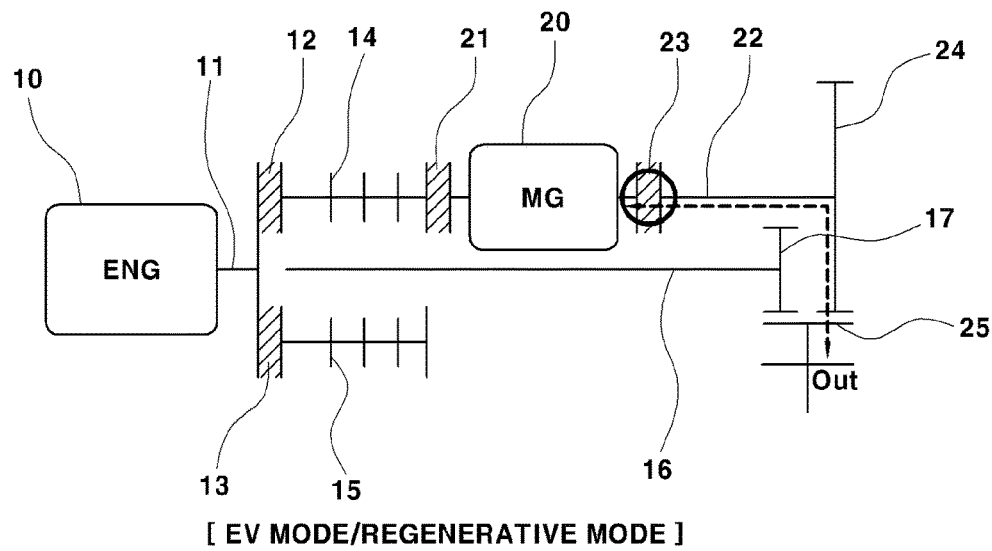

FIG. 5 illustrates a power transmission flow by a power train for a hybrid electric vehicle during EV mode/regenerative mode according to an embodiment of the present invention. In FIG. 5, the circle indicates clutch engagement, and the hidden line indicates a power transmission flow state.

Only the motor output clutch 23 is engaged, and the first and second clutches 12 and 13 for outputting the engine power and the motor input clutch 21 are disengaged.

In this state, when a current is applied to the motor 20 to operate, the motor power is outputted to the output shaft 22 through the motor output clutch 23, and then is outputted to a driving wheel through the first output gear 24 connected to the output shaft 22 of the motor 20, and the final output gear 25, implementing EV driving mode by the motor 20 alone.

In this case, during the braking of a vehicle, regenerative braking mode in which the motor 20 operates as a generator is implemented, charging the battery.

HEV Mode (Motor Assist)

Figure 6:
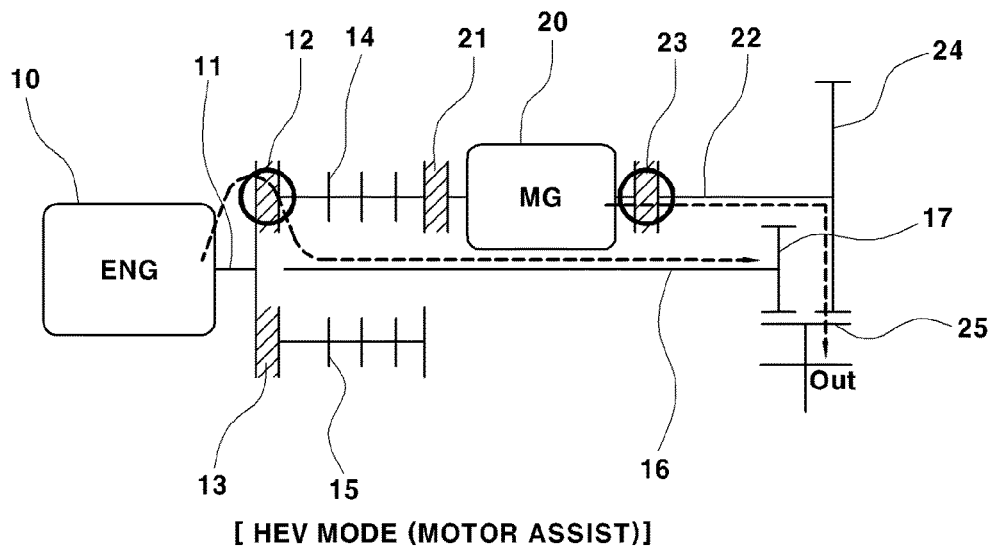

FIG. 6 illustrates a power transmission flow by a power train for a hybrid electric vehicle during HEV mode (motor assist) according to an embodiment of the present invention. In FIG. 6, the circles indicate clutch engagement, and the hidden line indicates a power transmission flow state.

The first clutch 12 and the motor output clutch 23 are engaged, and the second clutch 13 and the motor input clutch 21 are disengaged. Also, the first synchronizer 14 mounted on the output shaft of the first clutch 12 for output of the engine power operates for synchronization.

In this state, when the engine power is outputted through the first clutch 12 and the output shaft of the first clutch 12, the first synchronizer 14 synchronizes and delivers the engine power to the engine power output shaft 16, and the engine power is outputted to the final output gear 25 through the second output gear 16 mounted on the end portion of the engine power output shaft 16.

Simultaneously, the motor power is outputted to the output shaft 22 of the motor 20 through the motor output clutch 23, and then is outputted to the final output gear 25 through the first output gear 24 connected to the output shaft 22 of the motor 20.

Thus, HEV driving mode (motor assist) in which the motor assist power in addition to the engine power is outputted to the driving wheels may be easily implemented.

HEV Mode (Motor Charge)

Figure 7:
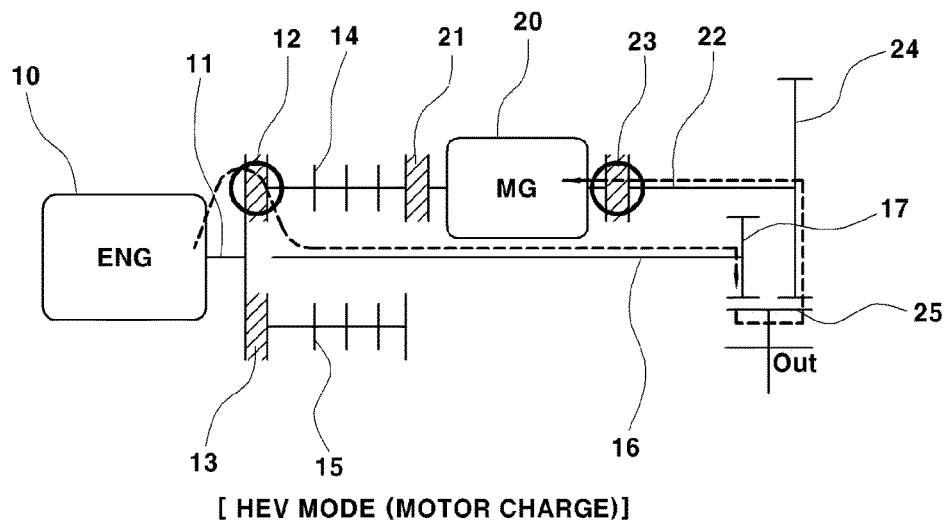

FIG. 7 illustrates a power transmission flow by a power train for a hybrid electric vehicle during HEV mode (motor charge) mode according to an embodiment of the present invention. In FIG. 7, the circles indicate clutch engagement, and the hidden line indicates a power transmission flow state.

The first clutch 12 and the motor output clutch 23 are engaged, and the second clutch 13 and the motor input clutch 21 are disengaged. Also, the first synchronizer 14 mounted on the output shaft of the first clutch 12 for output of the engine power operates for synchronization.

In this state, when the engine power is outputted through the first clutch 12 and the output shaft of the first clutch 12, the first synchronizer 14 synchronizes and delivers the engine power to the engine power output shaft 16, and the engine power is outputted to the final output gear 25 through the second output gear 16 mounted on the end portion of the engine power output shaft 16.

In this case, when the engine power outputted from the second output gear 17 to the final output gear 25 is again delivered from the final output gear 25 to the first output gear 24 by the final reduction gear ratio principle, the engine power is inputted from the first output gear 24 to the motor 20 via the motor output clutch 23. Thus, the motor operates as a generator, charging the battery.

Thus, HEV (motor charge) mode in which spare power of the engine is inputted into the motor for generation may be easily implemented.

Engine Only Mode

Figure 8:
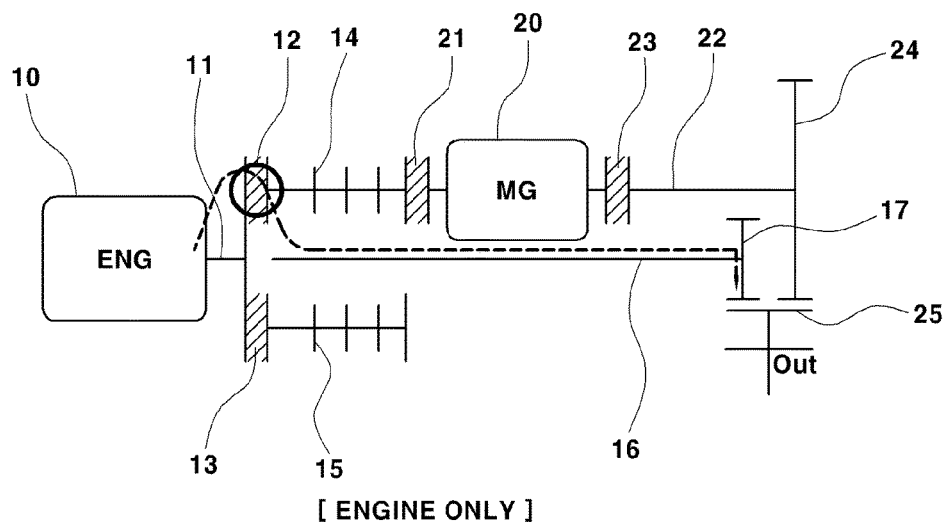

FIG. 8 illustrates a power transmission flow by a power train for a hybrid electric vehicle during engine only mode according to an embodiment of the present invention. In FIG. 8, the circles indicate clutch engagement, and the hidden line indicates a power transmission flow state.

One of the first clutch 12 and the second clutch 13 is engaged, and the motor input clutch 21 and the motor output clutch 23 are disengaged.

In this state, when the engine power is delivered to the first synchronizer 14 through the first clutch 12 or delivered to the second synchronizer 15 through the second clutch 13, engine only mode in which the engine power is applied to the engine power output shaft 16 by the synchronization of the first synchronizer 14 or the second synchronizer 15 and then is outputted to the driving wheels through the second output gear 17 and the final output gear 25 is implemented.

The present invention provides the following effects.

First, using only one motor and an engine, it is possible to high-efficiently implement various driving modes such as high-efficiency EV mode, engine and motor parallel HEV mode, and engine connecting mode.

Second, compared to a conventional power train using two motors, since only one motor is used, the manufacturing cost for constructing a power train for a hybrid electric vehicle may be reduced.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A power train for a hybrid electric vehicle, comprising:
   an engine;
   a dual clutch simultaneously connected to an output shaft of the engine, the dual clutch comprising a first clutch and a second clutch;
   a first synchronizer and a second synchronizer mounted on an output shaft of the first clutch and an output shaft of the second clutch, respectively;
   an engine power output shaft synchronized with the first synchronizer or the second synchronizer to output an engine power;
   a motor connected to the output shaft of the first clutch or the output shaft of the second clutch;
   a motor input clutch mounted to exchange power between the output shaft of the first clutch and the motor or between the output shaft of the second clutch and the motor; and
   a motor output clutch mounted on an output shaft of the motor to cut or connect an output of motor power.

2. The power train of claim 1, further comprising:
   a first output gear connected to an end portion of the output shaft of the motor;
   a second output gear connected to the engine power output shaft; and
   a final output gear simultaneously engaged with the first output gear and the second output gear.

3. The power train of claim 1, wherein while the first clutch and the motor input clutch are engaged, an engine start mode is implemented in which the motor power is delivered to the engine, or an N-stage charge mode is implemented in which the engine power is delivered to the motor.

4. The power train of claim 1, wherein while only the motor output clutch is engaged, one of a regenerative braking mode and an EV mode is implemented in which the motor power is outputted through the output shaft of the motor.

5. The power train of claim 1, wherein while the first clutch or the second clutch is engaged and simultaneously the motor output clutch is engaged, an HEV (motor assist) mode is implemented in which the engine power is outputted to the engine power output shaft through the first or second synchronizer and simultaneously the motor power is auxiliary outputted through the output shaft of the motor.

6. The power train of claim 1, wherein while the first clutch or the second clutch is engaged and simultaneously the motor output clutch is engaged, an HEV (motor charge) mode is implemented in which the engine power is outputted to the engine power output shaft through the first or second synchronizer and simultaneously a spare power of the engine is inputted to the motor for generation.

7. The power train of claim 1, wherein while the first clutch or the second clutch is engaged, an engine only mode is implemented in which the engine power is outputted to the engine power output shaft through the first or second synchronizer.

* * * * *